United States Patent
Deng

(10) Patent No.: US 10,057,871 B2
(45) Date of Patent: Aug. 21, 2018

(54) DATA TRANSMISSION METHOD AND BASE STATION

(71) Applicant: SPREADTRUM COMMUNICATIONS (SHANGHAI) CO., LTD., Zhangjiang, Shanghai (CN)

(72) Inventor: Yun Deng, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 0 days.

(21) Appl. No.: 15/400,246

(22) Filed: Jan. 6, 2017

(65) Prior Publication Data

US 2017/0201959 A1 Jul. 13, 2017

(30) Foreign Application Priority Data

Jan. 12, 2016 (CN) .......................... 2016 1 0018134

(51) Int. Cl.
*H04W 60/00* (2009.01)
*H04W 76/10* (2018.01)
*H04W 84/04* (2009.01)
*H04W 88/02* (2009.01)
(Continued)

(52) U.S. Cl.
CPC ........... *H04W 60/00* (2013.01); *H04W 76/10* (2018.02); *H04W 84/042* (2013.01); *H04W 88/02* (2013.01); *H04W 88/08* (2013.01); *H04W 88/16* (2013.01)

(58) Field of Classification Search
CPC . H04W 60/00; H04W 76/021; H04W 76/046; H04W 84/042; H04W 88/02; H04W 88/08; H04W 88/16
See application file for complete search history.

(56) References Cited

U.S. PATENT DOCUMENTS

| 8,396,083 B2 * | 3/2013 | Maheshwari ....... H04W 28/065 370/473 |
| 9,060,028 B1 | 6/2015 | Azem et al. |
| 9,717,064 B2 | 7/2017 | Singh et al. |

(Continued)

FOREIGN PATENT DOCUMENTS

| CN | 102612017 A | 7/2012 |
| CN | 104641690 A | 5/2015 |

OTHER PUBLICATIONS

SIPO First Office Action for corresponding CN Application No. 2016100181345; dated May 2, 2018.

*Primary Examiner* — Mehmood B. Khan
(74) *Attorney, Agent, or Firm* — Cantor Colburn LLP

(57) ABSTRACT

A data transmission method and a base station are provided. The method includes: setting up an RRC connection with a UE, and acquiring an information element for requesting C-SGN registration from a message transmitted by the UE during the setup of the RRC connection; transmitting an initial UE message to a connected C-SGN, wherein the C-SGN registers the UE based on the information element for requesting C-SGN registration contained in the initial UE message; after the UE registers to the C-SGN and data is received from the UE, transmitting the data to the C-SGN which then transmits the data to a destination address. By the method, signaling interaction during data transmission is reduced, which may improve efficiency of data transmission and reduce consumption of radio network resources.

24 Claims, 5 Drawing Sheets

(51) Int. Cl.
 *H04W 88/08* (2009.01)
 *H04W 88/16* (2009.01)

(56) References Cited

U.S. PATENT DOCUMENTS

| | | | | |
|---|---|---|---|---|
| 2012/0163296 | A1* | 6/2012 | Cheon | H04W 76/10 |
| | | | | 370/328 |
| 2015/0092554 | A1* | 4/2015 | Mochizuki | H04W 24/10 |
| | | | | 370/235 |
| 2015/0312822 | A1* | 10/2015 | Bangolae | H04W 36/08 |
| | | | | 370/311 |
| 2016/0127894 | A1* | 5/2016 | Kahn | H04W 12/04 |
| | | | | 380/270 |
| 2016/0374048 | A1* | 12/2016 | Griot | H04W 4/70 |
| 2017/0012956 | A1* | 1/2017 | Lee | H04L 63/08 |
| 2017/0013454 | A1* | 1/2017 | Lee | H04W 76/38 |
| 2017/0019930 | A1* | 1/2017 | Lee | H04W 74/0833 |
| 2017/0041752 | A1* | 2/2017 | Baek | H04W 4/023 |
| 2017/0048112 | A1* | 2/2017 | Ronneke | H04L 41/12 |
| 2017/0048695 | A1* | 2/2017 | Ronneke | H04W 8/24 |
| 2017/0064487 | A1* | 3/2017 | Buckley | H04W 4/70 |
| 2017/0086062 | A1* | 3/2017 | Chen | H04L 69/325 |
| 2017/0094621 | A1* | 3/2017 | Xu | H04W 56/001 |
| 2017/0111754 | A1* | 4/2017 | Baghel | H04W 4/70 |
| 2017/0111932 | A1* | 4/2017 | Uemura | H04W 74/0833 |
| 2017/0127263 | A1* | 5/2017 | Chen | H04L 41/0803 |
| 2017/0134881 | A1* | 5/2017 | Oh | H04W 4/70 |
| 2017/0142766 | A1* | 5/2017 | Kim | H04W 36/00 |
| 2017/0150330 | A1* | 5/2017 | Kim | H04W 4/90 |
| 2017/0164265 | A1* | 6/2017 | Dai | H04W 40/36 |

* cited by examiner

DATA TRANSMISSION METHOD AND BASE STATION

CROSS-REFERENCE TO RELATED APPLICATIONS

The present application claims priority to Chinese patent application No. 201610018134.5, filed on Jan. 12, 2016, and entitled "DATA TRANSMISSION METHOD AND BASE STATION", and the entire disclosure of which is incorporated herein by reference.

TECHNICAL FIELD

The present disclosure generally relates to communication technology field, and more particularly, to a data transmission method and a base station.

BACKGROUND

Mobility Management Entity (MME), as an essential control node of a Long Term Evolution (LTE) network in the 3rd Generation Partnership Project (3GPP) standard, is responsible for processing signaling and managing a bearer of a Non Access Stratum (NAS) of a User Equipment (UE) in a connected state. A base station and the MME are connected through an S1 interface. The base station and the UE perform signaling and data interaction through a Uu interface.

Currently, before transmitting data to a destination address through the internet, the UE sets up a Radio Resource Control (RRC) connection with the base station. Based on the RRC connection, the base station sends an initial UE message to the MME, and the MME can acquire identifier information of the UE from the Initial UE message and sets up a bearer channel dedicated for data transmission for the UE. Then the UE can transmit data through the bearer channel. Before setting up the bearer channel, a special procedure is performed for configuring an encrypting algorithm. During the setup of the bearer channel, the RRC connection is reconfigured. Specifically, for the transmission of uplink data, the UE transmits available data to the base station. After receiving the data from the UE, the base station transmits the data to a Serving-GateWay (S-GW) which then transmits the data to a Public Data Network-GateWay (P-GW). Afterward, the P-GW transmits the data to the destination address. After the above data transmission is completed, the MME releases the bearer channel.

However, even if Cellular IoT Serving Gateway Node (C-SGN) is applied, there is still a large amount of signaling interaction during the above data transmission, which consumes plenty of radio resources. However, effective bits actually transmitted are relatively few, which results in relatively low transmission efficiency.

SUMMARY

In embodiments of the present disclosure, the number of signaling during data transmission of a UE is reduced to improve efficiency of data transmission and reduce consumption of radio network resources.

In an embodiment of the present disclosure, a data transmission method is provided, including: setting up an RRC connection with a UE, and acquiring an information element for requesting C-SGN registration from a message transmitted by the UE during the setup of the RRC connection; transmitting an initial UE message to a connected C-SGN, wherein the C-SGN registers the UE based on the information element for requesting C-SGN registration contained in the initial UE message; and after the UE registers to the C-SGN and data is received from the UE, transmitting the data to the C-SGN which then transmits the data to a destination address.

Optionally, setting up an RRC connection with a UE, and acquiring an information element for requesting C-SGN registration from a message transmitted by the UE during the setup of the RRC connection may include: after receiving an RRC connection request message from the UE, transmitting an RRC connection setup message to the UE; and after receiving an RRC connection setup completion message from the UE, setting up an RRC connection with the UE, and acquiring the information element for requesting C-SGN registration based on at least one of the RRC connection request message and the RRC connection setup completion message.

Optionally, the method may further include: transmitting, to the UE, system information including an indication information element which indicates that registration to the C-SGN is supported, wherein the UE transmits the RRC connection request message based on the indication information element.

Optionally, the indication information element may be set according to different Public Land Mobile Network (PLMN) identifiers.

Optionally, the information element for requesting C-SGN registration may be represented by an RRC connection setup reason or a reserved vacant bit in the RRC connection request message.

Optionally, the information element for requesting C-SGN registration may be set in a Medium Access Control (MAC) Protocol Data Unit (PDU) which carries the RRC connection request message.

Optionally, the information element for requesting C-SGN registration may be represented by a newly added preset bit in the RRC connection setup completion message.

In another embodiment of the present disclosure, a data transmission method is provided, including: setting up an RRC connection with a UE, and acquiring an identifier information element of a registered C-SGN from a message transmitted by the UE during the setup of the RRC connection; and after receiving data transmitted by the UE, transmitting the data to the registered C-SGN which then transmits the data to a destination address.

Optionally, setting up an RRC connection with a UE, and acquiring an identifier information element of a registered C-SGN from a message transmitted by the UE during the setup of the RRC connection may include: after receiving an RRC connection request message from the UE, transmitting an RRC connection setup message to the UE; and after receiving an RRC connection setup completion message from the UE, setting up an RRC connection with the UE, and acquiring the identifier information element of the registered C-SGN based on at least one of the RRC connection request message and the RRC connection setup completion message.

Optionally, the method may further include: transmitting, to the UE, system information including an indication information element which indicates that registration to the C-SGN is supported, wherein the UE transmits the RRC connection request message based on the indication information element.

Optionally, the indication information element may be set according to different Public Land Mobile Network (PLMN) identifiers.

Optionally, the identifier information element of the registered C-SGN may be represented by a newly added preset bit in the RRC connection request message or in the RRC connection setup completion message.

In an embodiment of the present disclosure, a based station is provided, including: a connection setting up circuitry configured to set up an RRC connection with a UE; a first acquiring circuitry configured to acquire an information element for requesting C-SGN registration from a message transmitted by the UE during the setup of the RRC connection; a first transmitting circuitry configured to transmit an initial UE message to a connected C-SGN, wherein the C-SGN registers the UE based on the information element for requesting C-SGN registration contained in the initial UE message; a first receiving circuitry configured to receive data transmitted by the UE; and a second transmitting circuitry configured to: after the UE registers to the C-SGN and data is received from the UE, transmit the data to the C-SGN which then transmits the data to a destination address.

Optionally, the connection setting up circuitry includes: a first receiving sub-circuitry configured to receive an RRC connection request message from the UE; a first transmitting sub-circuitry configured to transmit an RRC connection setup message to the UE after the RRC connection request message is received from the UE; and a second receiving sub-circuitry configured to receive an RRC connection setup completion message from the UE, wherein an RRC connection is set up with the UE, wherein the first acquiring circuitry configured to: after the RRC connection setup completion message is received from the UE, acquire the information element for requesting C-SGN registration based on at least one of the RRC connection request message and the RRC connection setup completion message.

Optionally, the base station may further include a fourth transmitting circuitry, configured to transmit, to the UE, system information including an indication information element which indicates that registration to the C-SGN is supported, wherein the UE transmits the RRC connection request message based on the indication information element.

Optionally, the indication information element transmitted by the fourth transmitting circuitry may be set according to different Public Land Mobile Network (PLMN) identifiers.

Optionally, the information element for requesting C-SGN registration acquired by the first acquiring circuitry may be represented by an RRC connection setup reason or a reserved vacant bit in the RRC connection request message.

Optionally, the information element for requesting C-SGN registration acquired by the first acquiring circuitry may be set in a Medium Access Control (MAC) Protocol Data Unit (PDU) which carries the RRC connection request message.

Optionally, the information element for requesting C-SGN registration acquired by the first acquiring circuitry may be represented by a newly added preset bit in the RRC connection setup completion message.

In another embodiment of the present disclosure, a base station is provided, including: a connection setting up circuitry configured to set up an RRC connection with a UE; a second acquiring circuitry configured to acquire an identifier information element of a registered C-SGN from a message transmitted by the UE during the setup of the RRC connection; a first receiving circuitry configured to receive data transmitted by the UE; and a third transmitting circuitry configured to: after the data is received from the UE, transmit the data to the registered C-SGN which then transmits the data to a destination address.

Optionally, the connection setting up circuitry includes: a first receiving sub-circuitry configured to receive an RRC connection request message from the UE; a first transmitting sub-circuitry configured to transmit an RRC connection setup message to the UE after the RRC connection request message is received from the UE; and a second receiving sub-circuitry configured to receive an RRC connection setup completion message from the UE, wherein an RRC connection is set up with the UE, wherein the second acquiring circuitry configured to: after the RRC connection setup completion message is received from the UE, acquire the identifier information element of the registered C-SGN based on at least one of the RRC connection request message and the RRC connection setup completion message.

Optionally, the base station may further include a fourth transmitting circuitry, configured to transmit, to the UE, system information including an indication information element which indicates that registration to the C-SGN is supported, wherein the UE transmits the RRC connection request message based on the indication information element.

Optionally, the indication information element transmitted by the fourth transmitting circuitry may be set according to different Public Land Mobile Network (PLMN) identifiers.

Optionally, the identifier information element of the registered C-SGN acquired by the second acquiring circuitry may be represented by a newly added preset bit in the RRC connection request message or in the RRC connection setup completion message.

Embodiments of the present disclosure may provide following advantages. In the data transmission method provided in an embodiment, based on an information element for requesting C-SGN registration acquired from a message transmitted by a UE, a base station can know that the UE needs to register to a C-SGN. Accordingly, the UE transmits an initial UE message to a connected C-SGN, and the C-SGN registers the UE based on the initial UE message. After the UE registers to the C-SGN, data transmitted by the UE can be sent to the C-SGN through the base station, and then be transmitted to a destination address through the C-SGN. From above, it is only necessary to register the UE to the C-GSN before data transmission, and an MME doesn't need to set up a bearer channel for data transmission. Therefore, signaling interaction during data transmission is reduced, which may improve efficiency of data transmission and reduce consumption of radio network resources.

In the data transmission method provided in another embodiment, based on an identifier information element of a registered C-SGN acquired from a message transmitted by a UE, a base station can know that the UE has registered to the C-SGN and information about the registered C-SGN. After receiving data from the UE, the base station can directly transmit the data to the registered C-SGN which then transmits the data to a destination address. Therefore, the UE may not repeatedly register to the C-SGN which is connected with the base station, and an MME doesn't need to set up a bearer channel for data transmission. Therefore, signaling interaction during data transmission is reduced, which may improve efficiency of data transmission and reduce consumption of radio network resources.

DETAILED DESCRIPTION

Figure 1:
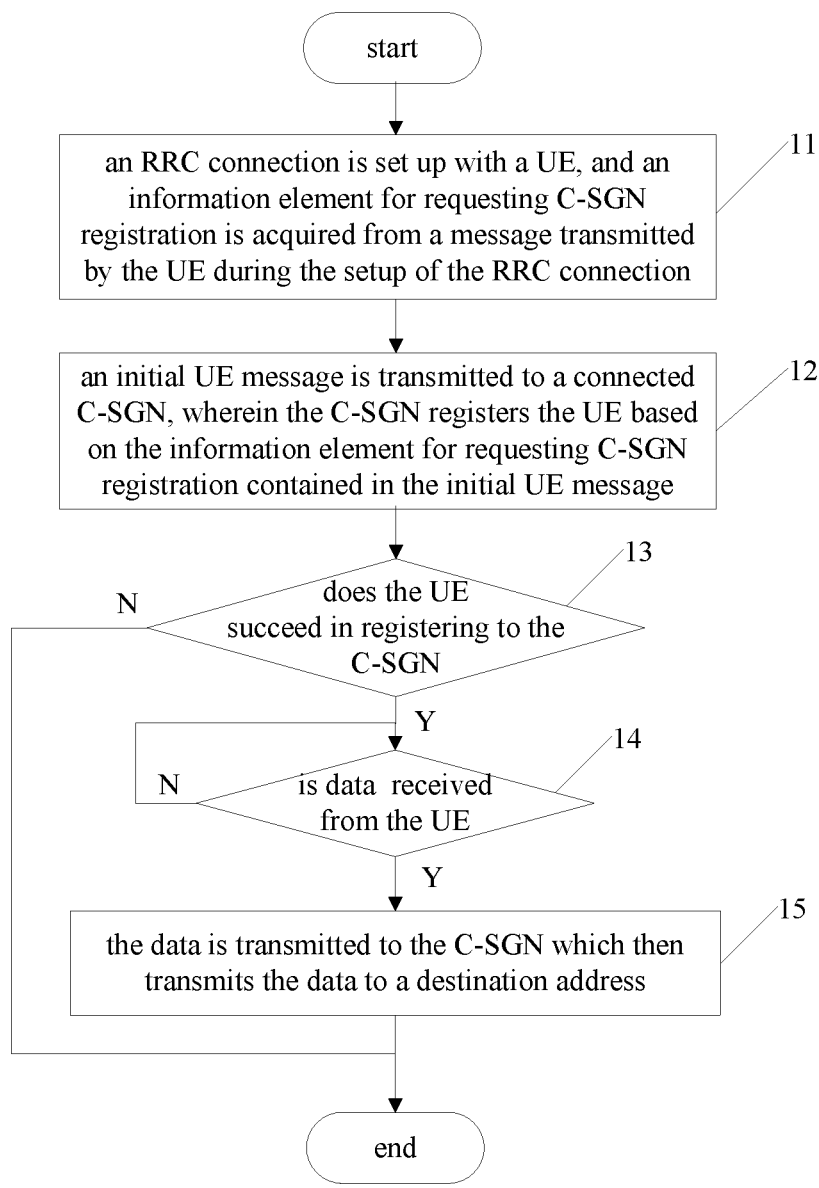
FIG. 1 schematically illustrates a flow chart of a data transmission method according to an embodiment.

Currently, before transmitting data to a destination address through the internet, the UE sets up an RRC connection with the base station. After receiving an RRC connection setup completion message from the UE, the base station sends an initial UE message to the MME, and the MME can acquire identifier information of the UE from the Initial UE message and sets up a bearer channel dedicated for data transmission for the UE. Then the UE can transmit data through the bearer channel. For setting up the bearer channel, there is a large amount of signaling interaction between the UE and the base station, and between the base station and the MME, which may degrade efficiency of data transmission and result in great consumption of radio network resources.

To improve efficiency of data transmission. C-SGN network element is applied in network for transmission of small data. After an RRC connection is set up between the UE and the base station, small data is transmitted through an established bearer channel After receiving the small data, the base station transmits the small data to the C-SGN directly. From above, no bearer channel dedicated for data transmission needs to be set up, which may reduce signaling interaction and save radio resources.

However, in existing techniques, how to perform signaling interaction among the UE, the base station and the C-SGN to realize the above procedure is not provided. After receiving NAS signaling or data from the UE, the base station still sends the NAS signaling to the MME, and sends the data to the S-GW rather than the C-SGN.

In an embodiment, a data transmission method is provided. Based on an information element for requesting C-SGN registration acquired during setup of RRC connection from a message transmitted by a UE, a base station can know that the UE needs to register to a C-SGN. Accordingly, the base station transmits an initial UE message to the C-SGN rather than an MME, and the C-SGN registers the UE based on the initial UE message (i.e. the C-SGN permits the UE's registration). After the UE registers to the C-SGN, data transmitted by the UE can be sent to the C-SGN through the base station, and then be transmitted to a destination address through the C-SGN. From above, it is unnecessary to set up a bearer channel for data transmission. Therefore, signaling interaction during data transmission is reduced, which may improve efficiency of data transmission and reduce consumption of radio network resources.

In another embodiment, a data transmission method is provided. Based on an identifier information element of a registered C-SGN acquired from a message transmitted by a UE, a base station can know that the UE has registered to the C-SGN and information about the registered C-SGN. After receiving data from the UE, the base station can directly transmit the data to the registered C-SGN which then transmits the data to a destination address. Therefore, the UE may not repeatedly register to the C-SGN which is connected with the base station, and an MME doesn't need to set up a bearer channel for data transmission. Therefore, signaling interaction during data transmission is reduced, which may improve efficiency of data transmission and reduce consumption of radio network resources.

In order to clarify the object, solutions and advantages of embodiments of the present disclosure, embodiments of present disclosure will be described clearly in detail in conjunction with accompanying drawings.

In an embodiment, regarding a case that a UE hasn't registered to a C-SGN that is connected with a base station before data transmission, a data transmission method is provided. Referring to FIG. 1, the method is described in detail below.

In step 11, an RRC connection is set up with a UE, and an information element for requesting C-SGN registration is acquired from a message transmitted by the UE during the setup of the RRC connection.

In some embodiments, before the RRC connection is set up between the base station and the UE, the UE is in an idle state and supports registering to a C-SGN. The C-SGN is generally located between the base station and a P-GW, and supports transmission of short messages and small data and a portion of functions of an MME.

In some embodiments, when the RRC connection is being set up with the UE, the UE may transmit an RRC connection request message to the base station. After receiving the RRC connection request message from the UE, the base station transmits an RRC connection setup message to the UE. After receiving the RRC connection setup message, the UE sets up the RRC connection with the base station, and feeds back an RRC connection setup completion message to the base station. After receiving an RRC connection setup completion message from the UE, the RRC connection between the base station and the UE is set up.

In some embodiments, to make the base station know that the UE needs to register to the C-SGN, the UE may set an information element for requesting C-SGN registration in the RRC connection request message or the RRC connection setup completion message during the setup of the RRC connection. In this way, when receiving the RRC connection request message or the RRC connection setup completion message, the base station can acquire the information element for requesting C-SGN registration. In some embodiments, the information element for requesting C-SGN registration may be set in both the RRC connection request message and the RRC connection setup completion message. In this way, no matter the base station receives the RRC connection request message or the RRC connection setup completion message, the base station can acquire the information element for requesting C-SGN registration.

In some embodiments, the information element for requesting C-SGN registration may be represented by an RRC connection setup reason in the RRC connection request message. For example, registering to the C-SGN or transmitting small data is indicated in the RRC connection setup reason. In some embodiments, the information element for requesting C-SGN registration may be represented by a reserved vacant bit in the RRC connection request message. For example, registering to the C-SGN or transmitting small data is indicated in the reserved vacant bit.

In some embodiments, considering that vacant bits in the RRC connection request message are relatively few, the information element for requesting C-SGN registration may be set in a MAC PDU which carries the RRC connection request message. For example, registering to the C-SGN or transmitting small data is indicated in a particular Logical Channel Identifier (LCID) in the MAC PDU.

In some embodiments, considering that the RRC connection setup completion message includes more bits, the information element for requesting C-SGN registration may be represented by a newly added bit in the RRC connection setup completion message, that is, registering to the C-SGN or transmitting small data is indicated in the newly added bit in the RRC connection setup completion message.

It should be noted that, in some embodiments, the number of bits the information element for requesting C-SGN registration occupies may be determined according to detailed indication information and a setting position of the information element by those skilled in the art, and is not limited in embodiments of the present disclosure, as long as the base station can know that the UE needs to register to the C-SGN after it acquires the information element for requesting C-SGN registration.

In some embodiments, when the RRC connection setup completion message includes an NAS signaling transmitted to the MME, as not capable of analyzing the NAS signaling, the base station may consider the NAS signaling as a bit stream which is prone to be confused with a NAS signaling for transmitting a C-SGN registration request which is also included in the RRC connection setup completion message. Therefore, a bit dedicated for transmitting a registration request or a data packet to the C-SGN is set and marked in the RRC connection setup completion message. For example, the information element for requesting C-SGN registration may be represented by a newly added preset bit in the RRC connection setup completion message. In this way, the base station can determine whether an NAS signaling in the RRC connection setup completion message is transmitted to the MME or to the C-SGN, after it receives the RRC connection setup completion message.

In some embodiments, to prevent the UE from aimlessly transmitting an RRC connection request to the base station, and to further save radio network resources and improve efficiency of data transmission, the base station may broadcast system information in its owning cells, and sets an indication information element which indicates that registration to the C-SGN is supported in the system information. After receiving the system information, the UE which camps on one of the cells can know that the base station supports registration to the C-SGN based on the indication information element contained in the system information, and then transmits the RRC connection request to the base station.

In some embodiments, only one bit in the system information is used to indicate whether to support registration to the C-SGN, that is, the indication information element may only occupy one bit. In some embodiments, the base station may set different bits to indicate whether to support registration to the C-SGN corresponding to different PLMNs, according to identifiers of the different PLMNs. After receiving the system information, the UE can check whether the indication information element indicates that registration to the C-SGN corresponding to the PLMN is supported according to an identifier of the PLMN, where the PLMN is the one the UE expects to register to or the one the UE has registered to.

In some embodiments, to reduce power consumption of the UE reading the system information, the system information including the indication information element transmitted to the UE by the base station may be a System Information Block (SIB) 1. As SIB 1 is transmitted relatively frequently, the power consumption of the UE reading the system information may be reduced.

In step 12, an initial UE message is transmitted to a connected C-SGN, wherein the C-SGN registers the UE based on the information element for requesting C-SGN registration contained in the initial UE message.

In some embodiments, the base station may be connected with a plurality of C-SGNs at the same time. After setting up the RRC connection with the UE and acquiring the information element for requesting the C-SGN registration (i.e., the NAS signaling), the base station transmits the information element for requesting the C-SGN registration to one of the plurality of connected C-SGNs through the initial UE message. The initial UE message may not only include the information element for requesting the C-SGN registration, but also include identifier information of the UE. Therefore, the C-SGN which receives the information element for requesting the C-SGN registration may perform a registration procedure including authentication to the UE according to information carried by the initial UE message. If the registration procedure succeeds, the UE can register to the C-SGN; or else, the UE fails to register to the C-SGN.

In some embodiments, the base station may select the C-SGN to be registered based on load situations of the plurality of connected C-SGNs. For example, the base station may select one of the plurality of connected C-SGNs which has the fewest loads as the C-SGN to be registered by the UE.

In step 13, whether the UE succeeds in registering to the C-SGN is determined.

If it is determined that the UE succeeds in the registration, step 14 is performed; or else, data transmission is ended. In some embodiments, if the UE fails to register to the C-SGN, the base station may interact signaling with the MME, and the MME will set up a bearer channel for the UE to perform data transmission.

In step 14, whether data is received from the UE is determined.

If the data is received from the UE, step 15 is performed; or else, step 14 is continued to be performed.

In step 15, the data is transmitted to the C-SGN which then transmits the data to a destination address.

In some embodiments, after receiving the data from the base station, the C-SGN may transmit the data to different target network elements according to types of the data (including Internet Protocol (IP) data, Non-IP data or Short Message Service (SMS) data) if the UE is in a non-roaming state (the UE may determine whether it is in the non-roaming state according to a signed PLMN identifier and a current registered PLMN identifier). Afterwards, a corresponding target network element transmits the data to the destination address. In some embodiments, the target network elements may be any network nodes connected with the C-SGN. If the UE is in a roaming state, the C-SGN may transmit the data to a P-GW which then transmits the data to the destination address.

In embodiments of the present disclosure, the UE may include but not limited to a portable device, such as a mobile phone, a notebook, a tablet personal computer or an onboard computer. Besides, communication modes the UE supports are also not limited. For example, the UE is a mobile phone which supports at least two communication modes, such as Global System for Mobile Communications (GSM) and LTE.

In an embodiment, a signaling interaction diagram of the above data transmission method is provided. Hereinafter, the data transmission method is described in conjunction with FIG. 2.

Figure 2:
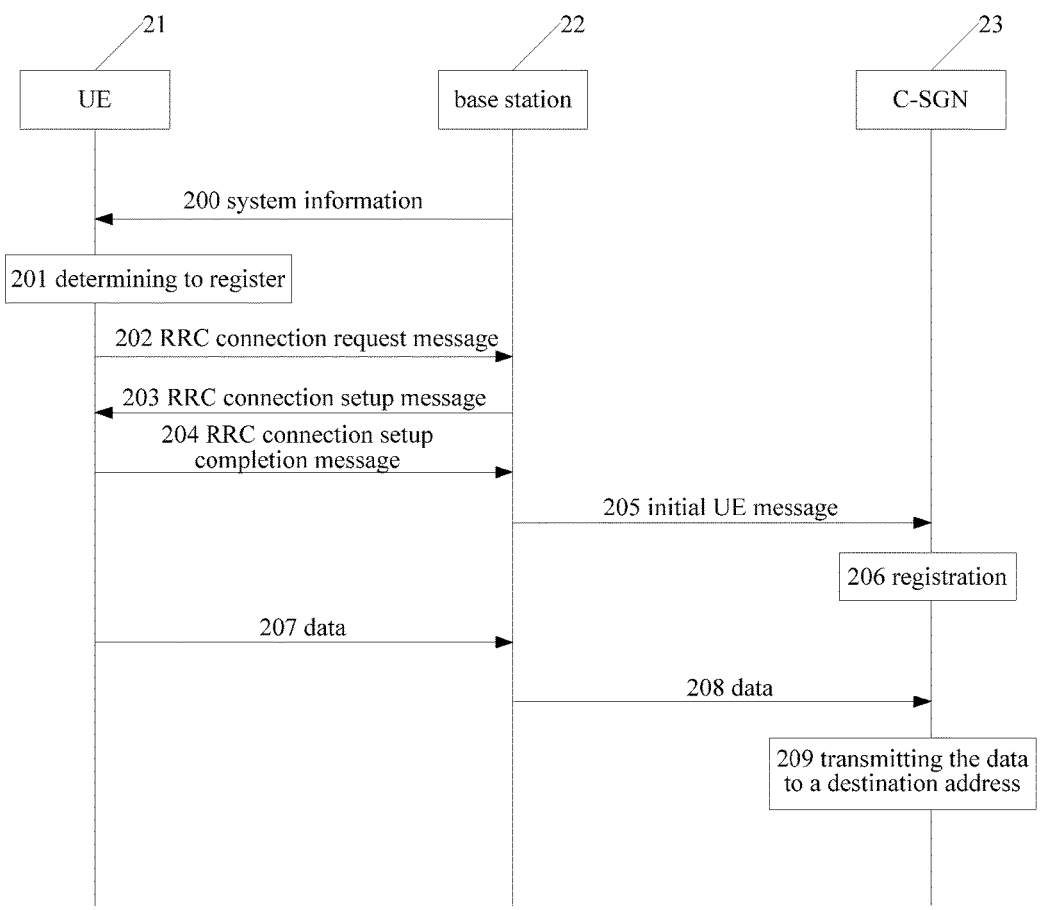
FIG. 2 schematically illustrates a signaling interaction diagram of data transmission according to an embodiment.

Referring to FIG. 2, the method includes following steps.

In step 200, a base station 22 transmits to a UE 21 system information including an indication information element which indicates that registration to a C-SGN 23 is supported.

In step 201, after receiving the system information, the UE 21 determines it needs to register to the C-SGN 23.

In step 202, the UE 21 transmits an RRC connection request message to the base station 22.

In step 203, the base station 22 transmits an RRC connection setup message to the UE 21.

In step 204, the UE 21 transmits to the base station 22 an RRC connection setup completion message including an information element for requesting C-SGN 23 registration.

In step 205, the base station 22 transmits an initial UE message to the C-SGN 23.

In step 206, the C-SGN 23 performs a registration procedure to the UE 21.

In step 207, after registering to the C-SGN 23, the UE 21 transmits data to the base station 22.

In step 208, the base station 22 transmits the data to the C-SGN 23.

In step 209, the C-SGN 23 transmits the data to a destination address.

In some embodiments, the information element for requesting the C-SGN 23 registration may be set in the RRC connection request message, and the corresponding signaling interaction may be referred to the above description and is not described in detail here.

From above, in the data transmission method, if the UE hasn't registered in the C-SGN connected with the base station before data transmission, the base station can know that the UE needs to register to the C-SGN based on the information element for requesting C-SGN registration acquired during the RRC connection setup procedure. Further, the base station interacts signaling with the C-SGN, and the C-SGN performs the registration procedure to the UE. In this way, after receiving data from the UE, the base station directly transmits the data to the C-SGN. Therefore, efficiency of data transmission may be improved and radio network resources may be saved.

Figure 3:
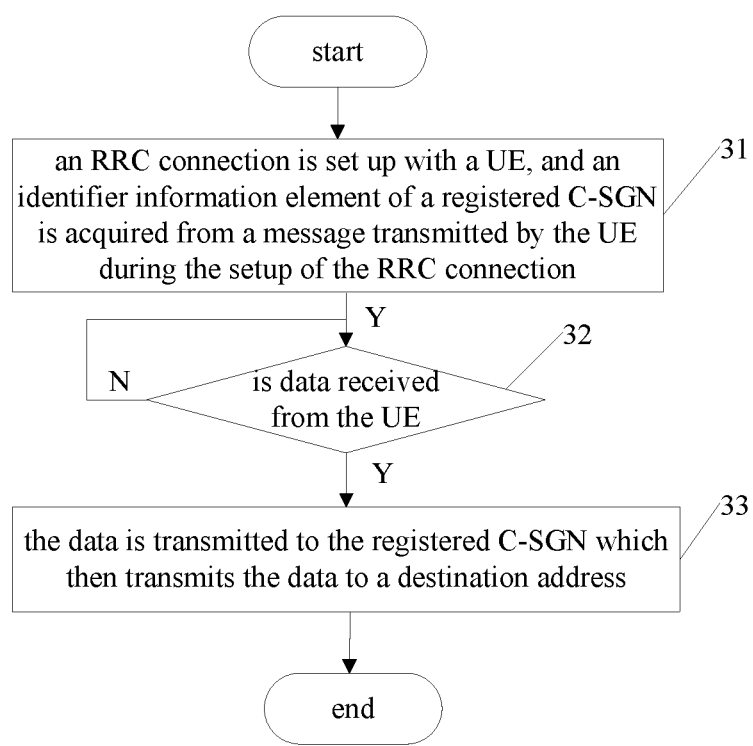
FIG. 3 schematically illustrates a flow chart of a data transmission method according to another embodiment.

In an embodiment, regarding a case that a UE has registered to a C-SGN that is connected with a base station before data transmission, a data transmission method is provided. Referring to FIG. 3, the method is described in detail below.

In step 31, an RRC connection is set up with a UE, and an identifier information element of a registered C-SGN is acquired from a message transmitted by the UE during the setup of the RRC connection.

In some embodiments, the UE may acquire the identifier information element of the registered C-SGN through various ways. For example, after the UE succeeds in registering to the one C-SGN which is connected with the base station, the C-SGN may indicate the identifier information of the registered C-SGN to the UE through an NAS signaling. Afterwards, the base station may release the RRC connection with the UE to make the UE in an idle state. If the UE needs to transmit small data again, the UE may indicate the identifier information of the registered C-SGN through an RRC connection request message or an RRC connection setup completion message. In this way, the base station transmits the small data transmitted from the UE to the C-SGN which the UE has registered to. In some embodiments, the identifier information element of the registered C-SGN may be set in both the RRC connection request message and the RRC connection setup completion message. In this way, no matter the base station receives the RRC connection request message or the RRC connection setup completion message, the base station can acquire the identifier information element of the registered C-SGN.

In some embodiments, the identifier information element of the registered C-SGN may be represented by a newly added bit in the RRC connection request message. In some embodiments, considering that the RRC connection setup completion message can include more bits, the identifier information element of the registered C-SGN may be represented by a newly added bit in the RRC connection setup completion message.

It should be noted that, in some embodiments, the number of bits the identifier information element of the registered C-SGN occupies may be determined according to detailed indication information and a setting position of the information element by those skilled in the art, and is not limited in embodiments of the present disclosure, as long as the base station can know the identifier information of the registered C-SGN after it acquires the identifier information element of the registered C-SGN.

In some embodiments, to prevent the UE from aimlessly transmitting an RRC connection request to the base station, and to further save radio network resources and improve efficiency of data transmission, the base station may broadcast system information in its owning cells, and sets an indication information element which indicates that registration to the C-SGN is supported in the system information. After receiving the system information, the UE which camps on one of the cells can know that the base station supports registration to the C-SGN based on the indication information element contained in the system information, and then transmits the RRC connection request to the base station for registration to the C-SGN.

In some embodiments, only one bit in the system information is used to indicate whether to support registration to the C-SGN, that is, the indication information element may only occupy one bit. In some embodiments, the base station may set different bits to indicate whether to support registration to the C-SGN corresponding to different PLMNs, according to identifiers of the different PLMNs. After receiving the system information, the UE can check whether the indication information element indicates that registration to the C-SGN corresponding to the PLMN is supported according to an identifier of the PLMN, where the PLMN is the one the UE expects to register to or the one the UE has registered to.

In some embodiments, to reduce power consumption of the UE reading the system information, the system information including the indication information element transmitted to the UE by the base station may be a SIB 1. As SIB 1 is transmitted relatively frequently, the power consumption of the UE reading the system information may be reduced.

In step 32, whether data is received from the UE is determined.

If the data is received from the UE, step 33 is performed; or else, step 32 is continued to be performed.

In step 33, the data is transmitted to the registered C-SGN which then transmits the data to a destination address.

In some embodiments, after receiving the data from the base station, the registered C-SGN may transmit the data to different target network elements according to types of the data (including Internet Protocol (IP) data, Non-IP data or Short Message Service (SMS) data) if the UE is in a non-roaming state (the UE may determine whether it is in the non-roaming state according to a signed PLMN identifier and a current registered PLMN identifier). Afterwards, a corresponding target network element transmits the data to the destination address. In some embodiments, the target network elements may be any network nodes connected with the C-SGN. If the UE is in a roaming state, the C-SGN may transmit the data to a P-GW which then transmits the data to the destination address.

In an embodiment, a signaling interaction diagram of the above data transmission method is provided. Hereinafter, the data transmission method is described in conjunction with FIG. 4.

Figure 4:
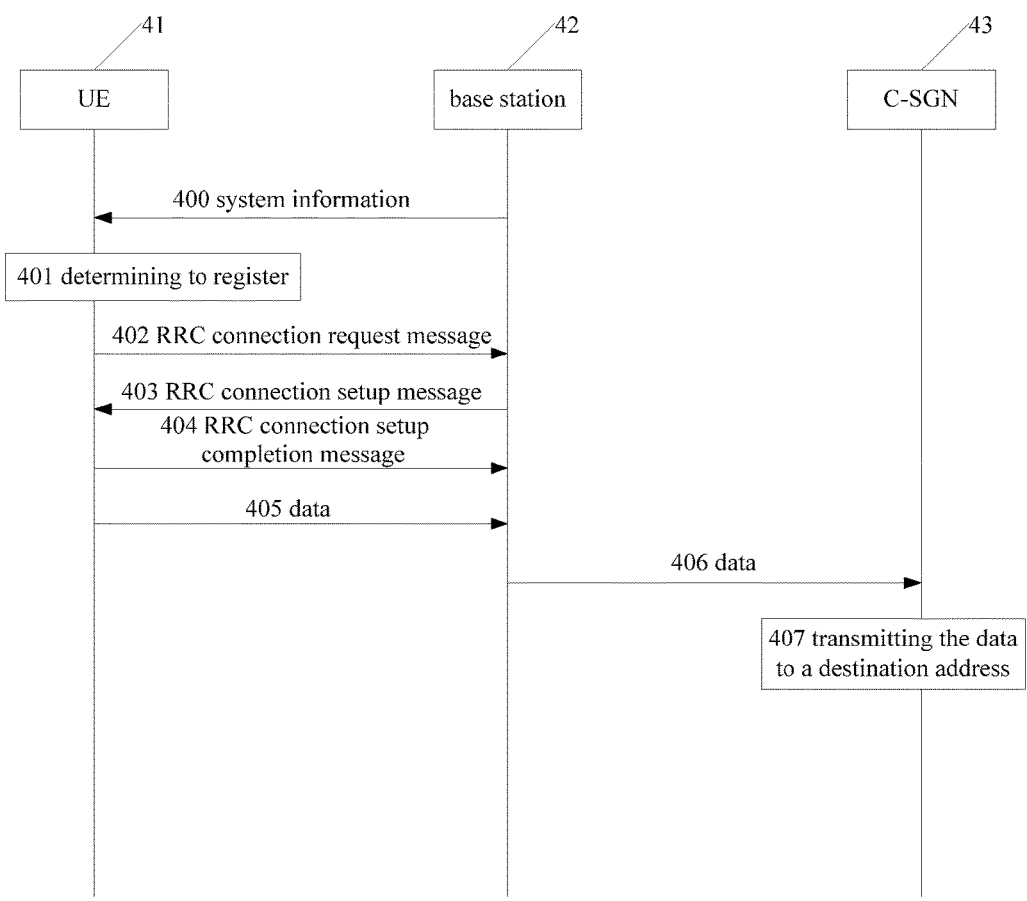
FIG. 4 schematically illustrates a signaling interaction diagram of data transmission according to another embodiment.

Referring to FIG. 4, the method includes following steps.

In step 400, a base station 42 transmits to a UE 41 system information including an indication information element which indicates that registration to a C-SGN 43 is supported.

In step 401, after receiving the system information, the UE 41 determines it needs to register to the C-SGN 43.

In step 402, the UE 41 transmits an RRC connection request message to the base station 42.

In step 403, the base station 42 transmits an RRC connection setup message to the UE 41.

In step 404, the UE 41 transmits to the base station 42 an RRC connection setup completion message including an identifier information element of the registered C-SGN 43.

In step 405, the UE 41 transmits data to the base station 42.

In step 406, the base station 42 transmits the data to the C-SGN 43 according to the acquired identifier information of the registered C-SGN 43.

In step 407, the C-SGN 23 transmits the data to a destination address.

In some embodiments, the identifier information element of the registered C-SGN 43 may be set in the RRC connection request message, and the corresponding signaling interaction may be referred to the above description and is not described in detail here.

From above, in the data transmission method, if the UE has registered in one C-SGN connected with the base station before data transmission, the base station can select the C-SGN to be connected with the UE based on the identifier information element of the registered C-SGN acquired during the RRC connection setup procedure. In this way, after receiving data from the UE, the base station directly transmits the data to the registered C-SGN, and doesn't need to select the C-SGN for the UE through signaling. Therefore, efficiency of data transmission may be improved and radio network resources may be saved.

To make those skilled in the art better understand and realize the present disclosure, a base station corresponding to the above data transmission method is described in detail.

Figure 5:
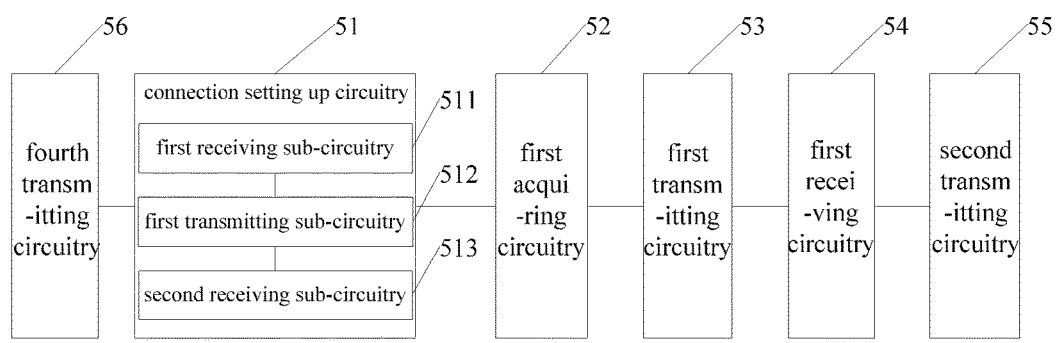
FIG. 5 schematically illustrates a structural diagram of a base station according to an embodiment.

In an embodiment, a base station is provided. Referring to FIG. 5, the base station includes a connection setting up circuitry 51, a first acquiring circuitry 52, a first transmitting circuitry 53, a first receiving circuitry 54 and a second transmitting circuitry 55.

The connection setting up circuitry 51 may be configured to set up an RRC connection with a UE. The first acquiring circuitry 52 may be configured to acquire an information element for requesting C-SGN registration from a message transmitted by the UE during the setup of the RRC connection. The first transmitting circuitry 53 may be configured to transmit an initial UE message to a connected C-SGN, wherein the C-SGN registers the UE based on the information element for requesting C-SGN registration contained in the initial UE message. The first receiving circuitry 54 may be configured to receive data transmitted by the UE. The second transmitting circuitry 55 may be configured to: after the UE registers to the C-SGN and data is received from the UE, transmit the data to the C-SGN which then transmits the data to a destination address.

In some embodiments, the connection setting up circuitry 51 includes a first receiving sub-circuitry 511, a first transmitting sub-circuitry 512 and a second receiving sub-circuitry 513. The first receiving sub-circuitry 511 may be configured to receive an RRC connection request message from the UE. The first transmitting sub-circuitry 512 may be configured to transmit an RRC connection setup message to the UE after the RRC connection request message is received. The second receiving sub-circuitry 513 may be configured to receive an RRC connection setup completion message from the UE. Accordingly, the first acquiring circuitry 52 may be configured to: after the RRC connection setup completion message is received from the UE, acquire the information element for requesting C-SGN registration based on at least one of the RRC connection request message and the RRC connection setup completion message.

In some embodiments, the information element for requesting C-SGN registration acquired by the first acquiring circuitry 52 may be represented by a newly added preset bit in the RRC connection request message or the RRC connection setup completion message.

In some embodiments, the base station may further include a fourth transmitting circuitry 56 configured to transmit, to the UE, system information including an indication information element which indicates that registration to the C-SGN is supported, wherein the UE transmits the RRC connection request message based on the indication information element. The indication information element may be set according to different PLMN identifiers.

In some embodiments, the system information including the indication information element which is transmitted by the fourth transmitting circuitry 56 may be SIB 1.

From above, in the case that the UE hasn't registered in the C-SGN connected with the base station before data transmission, the base station establishes the RRC connection with the UE through the RRC connection setting up circuitry 51 and acquires the information element for requesting C-SGN registration through the first acquiring circuitry 52 during the RRC connection setup procedure, so that the base station can know that the UE needs to register to the C-SGN. Further, the base station interacts signaling with the C-SGN through the first transmitting circuitry 53, and the C-SGN performs the registration procedure to the UE. In this way, after the first receiving circuitry 54 receives data from the UE, the second transmitting circuitry 55 directly transmits the data to the C-SGN which then transmits the data to the destination address. Therefore, efficiency of data transmission may be improved and radio network resources may be saved.

Figure 6:
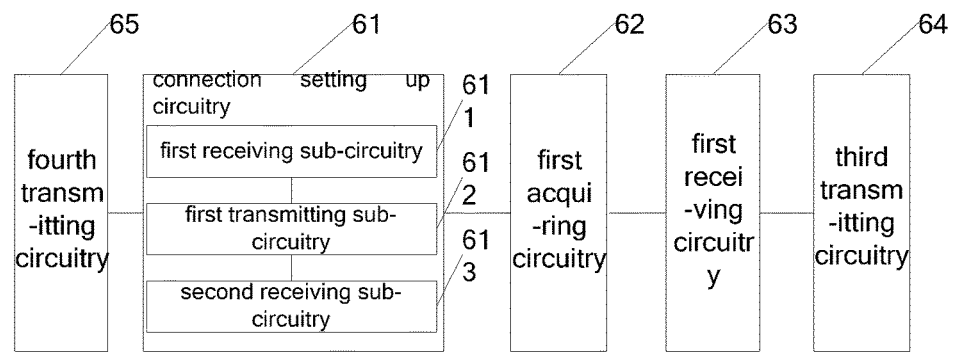
FIG. 6 schematically illustrates a structural diagram of a base station according to another embodiment.

In another embodiment, a base station is provided. Referring to FIG. 6, the base station includes a connection setting up circuitry 61, a second acquiring circuitry 62, a first receiving circuitry 63 and a third transmitting circuitry 64.

The connection setting up circuitry 61 may be configured to set up an RRC connection with a UE. The second acquiring circuitry 62 may be configured to acquire an identifier information element of a registered C-SGN from a message transmitted by the UE during the setup of the RRC connection. The first receiving circuitry 63 may be configured to receive data transmitted by the UE. The third transmitting circuitry 64 may be configured to: after the data is received from the UE, transmit the data to the registered C-SGN which then transmits the data to a destination address.

In some embodiments, the connection setting up circuitry 61 may include first receiving sub-circuitry 611, a first transmitting sub-circuitry 612 and a second receiving sub-circuitry 613. The first receiving sub-circuitry 611 may be configured to receive an RRC connection request message from the UE. The first transmitting sub-circuitry 612 may be configured to transmit an RRC connection setup message to the UE after the RRC connection request message is received from the UE. The second receiving sub-circuitry 613 may be configured to receive an RRC connection setup completion message from the UE, wherein an RRC connection is set up with the UE. Accordingly, the second acquiring circuitry 62 may be configured to: after the RRC connection setup completion message is received from the UE, acquire the identifier information element of the registered C-SGN based on at least one of the RRC connection request message and the RRC connection setup completion message.

In some embodiments, the base station may further include a fourth transmitting circuitry 65 configured to transmit, to the UE, system information including an indication information element which indicates that registration to the C-SGN is supported, wherein the UE transmits the RRC connection request message based on the indication information element.

In some embodiments, the indication information element transmitted by the fourth transmitting circuitry 65 may be set according to different PLMN identifiers.

In some embodiments, the identifier information element of the registered C-SGN acquired by the second acquiring circuitry 62 may be represented by a newly added preset bit in the RRC connection request message or in the RRC connection setup completion message.

From above, in the case that the UE has registered in one C-SGN connected with the base station before data transmission, the base station sets up the RRC connection with the UE through the connection setting up circuitry 61 and acquires the identifier information element of the registered C-SGN through the second acquiring circuitry 62. In this way, after the first receiving circuitry 63 receives data from the UE, the third transmitting circuitry 64 directly transmits the data to the registered C-SGN. No extra registration procedure needs to be performed. Therefore, signaling interaction during data transmission is reduced, which may improve efficiency of data transmission and reduce consumption of radio network resources.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data transmission method, comprising:
    transmitting, to a User Equipment (UE) a system information comprising an indication information element which indicates that registration to a Cellular IoT Serving Gateway Node (C-SGN) is supported, wherein the UE transmits a Radio Resource Control (RRC) connection request message based on the indication information element;
    when the RRC connection request message is received, setting up the RRC connection with the UE, and acquiring an information element for requesting C-SGN registration from a message transmitted by the UE during the setup of the RRC connection; wherein the C-SGN network element is applied in network for transmission of small data, and after an RRC connection is set up between the UE and the base station, the small data is transmitted through an established bearer channel;
    transmitting an initial UE message to a connected C-SGN, wherein the C-SGN registers the UE based on the information element for requesting C-SGN registration contained in the initial UE message; and
    after the UE registers to the C-SGN and the small data is received from the UE, transmitting the small data to the C-SGN which then transmits the small data to a destination address, without establishing a new special bearer channel.

2. The method according to claim 1, wherein setting up an RRC connection with a UE, and acquiring an information element for requesting C-SGN registration from a message transmitted by the UE during the setup of the RRC connection comprises:
    after receiving an RRC connection request message from the UE, transmitting an RRC connection setup message to the UE; and
    after receiving an RRC connection setup completion message from the UE, setting up an RRC connection with the UE, and acquiring the information element for requesting C-SGN registration based on at least one of the RRC connection request message and the RRC connection setup completion message.

3. The method according to claim 1, wherein the indication information element is set according to different Public Land Mobile Network (PLMN) identifiers.

4. The method according to claim 2, wherein the information element for requesting C-SGN registration is represented by an RRC connection setup reason or a reserved vacant bit in the RRC connection request message.

5. The method according to claim 2, wherein the information element for requesting C-SGN registration is set in a Medium Access Control (MAC) Protocol Data Unit (PDU) which carries the RRC connection request message.

6. The method according to claim 2, wherein the information element for requesting C-SGN registration is represented by a newly added preset bit in the RRC connection setup completion message.

7. A data transmission method, comprising:
    transmitting, to a User Equipment (UE) a system information comprising an indication information element which indicates that registration to a Cellular IoT Serving Gateway Node (C-SGN) is supported, wherein the UE transmits a Radio Resource Control (RRC) connection request message based on the indication information element;
    when the RRC connection request message is received, setting up the RRC connection with the UE and acquiring an identifier information element of the registered Cellular IoT Serving Gateway Node (C-SGN) from a message transmitted by the UE during the setup of the RRC connection; wherein the C-SGN network element is applied in network for transmission of small data, and after an RRC connection is set up between the UE and the base station, the small data is transmitted through an established bearer channel; and after receiving the small data transmitted by the UE, transmitting the small data to the registered C-SGN which then transmits the small data to a destination address, without establishing a new special bearer channel.

8. The method according to claim 7, wherein setting up an RRC connection with a UE, and acquiring an identifier information element of a registered C-SGN from a message transmitted by the UE during the setup of the RRC connection comprises:

after receiving an RRC connection request message from the UE, transmitting an RRC connection setup message to the UE; and after receiving an RRC connection setup completion message from the UE, setting up an RRC connection with the UE, and acquiring the identifier information element of the registered C-SGN based on at least one of the RRC connection request message and the RRC connection setup completion message.

9. The method according to claim 7, wherein the indication information element is set according to different Public Land Mobile Network (PLMN) identifiers.

10. The method according to claim 8, wherein the identifier information element of the registered C-SGN is represented by a newly added preset bit in the RRC connection request message or in the RRC connection setup completion message.

11. A base station, comprising:
a connection setting up circuitry configured to set up a Radio Resource Control (RRC) connection with a User Equipment (UE) when a RRC connection request message is received;
a first acquiring circuitry configured to acquire an information element for requesting Cellular IoT Serving Gateway Node (C-SGN) registration from a message transmitted by the UE during the setup of the RRC connection; wherein the C-SGN network element is applied in network for transmission of small data, and after an RRC connection is set up between the UE and the base station, the small data is transmitted through an established bearer channel;
a first transmitting circuitry configured to transmit an initial UE message to a connected C-SGN, wherein the C-SGN registers the UE based on the information element for requesting C-SGN registration contained in the initial UE message;
a first receiving circuitry configured to receive the small data transmitted by the UE;
a second transmitting circuitry configured to: after the UE registers to the C-SGN and the small data is received from the UE, transmit the small data to the C-SGN which then transmits the small data to a destination address, without establishing a new special bearer channel; and
a fourth transmitting circuitry, configured to transmit, to the UE, system information comprising an indication information element which indicates that registration to the C-SGN is supported, wherein the UE transmits the RRC connection request message based on the indication information element.

12. The base station according to claim 11, wherein the connection setting up circuitry comprises:
a first receiving sub-circuitry configured to receive an RRC connection request message from the UE;
a first transmitting sub-circuitry configured to transmit an RRC connection setup message to the UE after the RRC connection request message is received from the UE; and
a second receiving sub-circuitry configured to receive an RRC connection setup completion message from the UE, wherein an RRC connection is set up with the UE,
wherein the first acquiring circuitry configured to: after the RRC connection setup completion message is received from the UE, acquire the information element for requesting C-SGN registration based on at least one of the RRC connection request message and the RRC connection setup completion message.

13. The base station according to claim 11, wherein the indication information element transmitted by the fourth transmitting circuitry is set according to different Public Land Mobile Network (PLMN) identifiers.

14. The base station according to claim 12, wherein the information element for requesting C-SGN registration acquired by the first acquiring circuitry is represented by an RRC connection setup reason or a reserved vacant bit in the RRC connection request message.

15. The base station according to claim 12, wherein the information element for requesting C-SGN registration acquired by the first acquiring circuitry is set in a Medium Access Control (MAC) Protocol Data Unit (PDU) which carries the RRC connection request message.

16. The base station according to claim 12, wherein the information element for requesting C-SGN registration acquired by the first acquiring circuitry is represented by a newly added preset bit in the RRC connection setup completion message.

17. A base station, comprising:
a connection setting up circuitry configured to set up an Radio Resource Control (RRC) connection with a User Equipment (UE) when a RRC connection request message is received;
a second acquiring circuitry configured to acquire an identifier information element of a registered Cellular IoT Serving Gateway Node (C-SGN) from a message transmitted by the UE during the setup of the RRC connection; wherein the C-SGN network element is applied in network for transmission of small data, and after an RRC connection is set up between the UE and the base station, the small data is transmitted through an established bearer channel;
a first receiving circuitry configured to receive the small data transmitted by the UE;
a third transmitting circuitry configured to: after the small data is received from the UE, transmit the small data to the registered C-SGN which then transmits the small data to a destination address, without establishing a new special bearer channel; and
a fourth transmitting circuitry, configured to transmit, to the UE, system information comprising an indication information element which indicates that registration to the C-SGN is supported, wherein the UE transmits the RRC connection request message based on the indication information element.

18. The base station according to claim 17, wherein the connection setting up circuitry comprises:
a first receiving sub-circuitry configured to receive an RRC connection request message from the UE;
a first transmitting sub-circuitry configured to transmit an RRC connection setup message to the UE after the RRC connection request message is received from the UE; and a second receiving sub-circuitry configured to receive an RRC connection setup completion message from the UE, wherein an RRC connection is set up with the UE, wherein the second acquiring circuitry configured to: after the RRC connection setup completion message is received from the UE, acquire the identifier information element of the registered C-SGN based on at least one of the RRC connection request message and the RRC connection setup completion message.

19. The base station according to claim 17, wherein the indication information element transmitted by the fourth transmitting circuitry is set according to different Public Land Mobile Network (PLMN) identifiers.

20. The base station according to claim 18, wherein the identifier information element of the registered C-SGN acquired by the second acquiring circuitry is represented by a newly added preset bit in the RRC connection request message or in the RRC connection setup completion message.

21. The method according to claim 1, wherein the system information is a System Information Block1.

22. The method according to claim 1, wherein when a number of the connected C-SGN is more than one, the C-SGN which transmits the initial UE message to is selected based on load situations of the more than one connected C-SGNs.

23. The base station according to claim 11, wherein the system information is a System Information Block1.

24. The base station according to claim 11, wherein when a number of the connected C-SGN is more than one, the first transmitting circuitry is further configured to select the C-SGN which transmits the initial UE message to based on load situations of the more than one connected C-SGNs.

* * * * *